United States Patent Office 3,533,985
Patented Oct. 13, 1970

3,533,985
POWDERED HEAT CURABLE EPOXY RESIN COMPOSITIONS AND THEIR PREPARATION
William L. Lantz, Metuchen, and Joseph P. Manasia, Union, N.J., assignors to Shell Oil Company, New York, N.Y., a corporation of Delaware
No Drawing. Filed Dec. 27, 1966, Ser. No. 604,594
Int. Cl. C08g 51/04
U.S. Cl. 260—37
16 Claims

ABSTRACT OF THE DISCLOSURE

Powdered heat curable compositions which are stable at room temperature but cure in less than 1 minute at 275–300° F. to form flexible products having excellent mechanical and electrical properties comprise a homogeneous blend of (1) a special adduct of a polyepoxide and an amine, and (2) an imidazole compound.

---

This invention relates to new powdered heat curable epoxy resin compositions, to their preparation and use. More particularly, the invention relates to new powdered heat curable epoxy resin compositions which can be cured at a very fast rate at moderate temperatures to give products of excellent properties, to their preparation and use, particularly in fluidized bed processes and as molding compositions.

Specifically, the invention provides new and particularly useful finely divided powdered heat curable compositions which are stable at room temperature but cure in less than about 1 minute at 275° F.–300° F. to form flexible products having excellent mechanical electrical properties. These new compositions comprise a dry homogeneous blend of (1) a special adduct of a polyepoxide, and preferably a liquid glycidyl polyether of a polyhydric phenol, and an amine, such as aminophenol, which adduct has a softening point of between about 79° C. and 125° C., and preferably 90° C. to 125° C. and a WPE of 400 to 932, and (2) a heterocyclic compound possessing in the ring a substituted imino group and a secondary amino group, and preferably an imidazole compound, and (3) if desired fillers, pigments and the like.

As a special embodiment, the invention provides a process for preparing the new heat curable powdered compositions which comprises dry blending mixtures of the above-noted components in a pebble mill containing high density media as the grinding media at a moderate temperature so as to produce a unique product comprising agglomerates of the particles of the reactants formed into a homogeneous composite which does not segregate on standing.

As a further special embodiment, the invention provides a process for utilizing the new compositions in a fluidized bed process wherein the article to be coated is heated and passed into a fluidized bed of the new heat curable powdered composition, withdrawn and then subjected to brief heating to effect the final cure of the resinous coating on the article.

Epoxy molding compositions have been made in the past by mixing liquid epoxy resin, molten aromatic amine curing agent and various fillers at ambient temperature. The resulting high viscosity liquid molding material is then allowed to "B" stage. The resulting solid mass is then granulated and used in the molding operation. While such products produced relatively good moldings, the process had the following problems:

(1) Poor room temperature shelf life.
(2) Poor hot hardness of parts out of the mold (low heat deflection temperature).
(3) Slow cure (2 minutes at 150° C. depending on part size).

Some of these problems can be overcome by use of a blend of epoxy novolac resin and the aromatic amine curing agent. However, in solving some of these problems, one loses many of the advantages of the "B" stage products noted above, namely, mechanical properties, such as room temperature flexural, tensile and impact strengths, etc.

It is an object of the invention, therefore, to prepare new epoxy resin compositions and a method for their preparation. It is a further object to provide new heat-curable powdered epoxy resin compositions which are ideally suited for use as molding compositions and in fluidized bed processes. It is a further object to provide new powdered epoxy resin compositions which have ultra-fast cure rates. It is a further object to provide heat-curable epoxy resin compositions which have good room temperature stability. It is a further object to provide heat curable epoxy resin compositions which can be converted to products having excellent mechanical properties. It is a further object to provide epoxy resin compositions which can be converted to insoluble infusible products having excellent electrical properties. It is a further object to provide new epoxy resin compositions which can be converted to products having excellent hot hardness, low shrinkage and excellent impact strength. These and other objects of the invention will be apparent from the following detailed description thereof.

It has now been discovered that these and other objects are accomplished by the new powdered heat-curable epoxy resin compositions of the present invention comprising the dry homogeneous blend of (1) a special adduct of a polyepoxide, and preferably a liquid glycidyl polyether of a polyhydric phenol, and an amine, such as aminophenol, which adduct has a softening point of between about 79° C. and 125° C., and preferably 90° C. to 125° C., and a WPE of 400 to 932, and (2) a heterocyclic compound possessing in the ring a substituted imino group and a secondary amino group and preferably an imidazole compound, and (3) if desired fillers, pigments and the like. It has been surprisingly found that these special compositions correct all of the difficulties noted above, namely, the cure at a fast rate at moderate temperatures and the obtaining of products having superior mechanical and electrical properties. The new compositions, for example, can be cured in less than about 1 minute at 300° F. to form hard solid products having good mechanical properties, such as good room temperature flexural, tensile and impact strengths. In addition, the resulting product has good electrical properties, good solvent and chemical resistances and excellent adhesion to metals and the like. Furthermore, even though the compositions are heat curable, they have better storage stability at room temperature than compositions containing aromatic amines. Evidence of the superior properties may be found in the working examples at the end of the specification.

The new compositions are prepared by a unique dry blending process as described hereinafter. The compositions could not be prepared by conventional fusion techniques as the mixing temperatures of the fusion process are in the range of 200° F. to 300° F. and this would cure the compositions.

The special adducts used in the preparation of the new compositions of the invention comprise the acetone-soluble epoxy-containing adducts obtained by reacting polyepoxides, and preferably liquid glycidyl polyethers of polyhydric phenols, with polyamines which are preferably aromatic polyamines in controlled proportions so as to form solid adducts having a softening point between 79° C. to 125° C. and a WPE of 400 to 932.

The polyepoxides used in making the adducts are those organic materials which have more than one vic-epoxy group, i.e., more than one

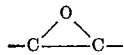

group, which group may be a terminal group, i.e., a

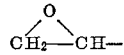

or in an internal position. The polyepoxides may be saturated or unsaturated, aliphatic, cycloaliphatic, aromatic or heterocyclic and may be substituted with substituents, such as chlorine, hydroxyl groups, ether radicals and the like.

Examples of such polyepoxides include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4-epoxybutoxy)diphenyl dimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (bisphenol A), 2,2-bis(4-hydroxyphenyl)butane, 4,4'-dihydroxybenzophenone, bis(4-hydroxyphenyl) ethane, 2,2-bis(4-hydroxyphenyl)pentane and 1,5-dihydroxynapthalene. The halogen-containing epoxides may be further exemplified by 3-chloro-2,3-chloro-1,2-epoxybutane, 3-bromo-1,2-epoxyhexane, 3-chloro-1,2-epoxyoctane, and the like. By varying the rations of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxyethers obtained by reacting, preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, (bis(4-hydroxycyclohexyl)dimethylmehane and the like.

The preparation of suitable polyepoxide polyethers is illustrated in U.S. 2,633,458 as Polyether F.

Particularly prefered members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 30 and 1,000.

Another group of polyepoxides include the epoxy esters of poly-basic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut, and dehydrated castor oil, methyl linoleate, butyl linoleate, ethyl 9,12-octadecadienoate, butyl 9,1215-octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate,
di(2,3-epoxybutyl)oxalate,
di(2,3-epoxyhexyl)succinate,
di(2,3-epoxyoctyl)tetrahydrophthalate,
di(4,5-epoxydodecyl)maleate,
di(2,3-epoxybutyl)terephthalate,
di(2,3-epoxypentyl)-thiodiproponate,
di(2,3-epoxybutyl)citrate and
di(4,5-epoxyoctadecyl)-malonate,
as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate,
3,4-epoxyhexyl 3,4-epoxypentanoate,
3,4-epoxycyclohexyl 3,4-cyclohexanoate,
2,3-epoxycyclohexylmethyl 2,3-epoxycyclohexanoate, and
3,4-epoxycyclohexyl 4,5-epoxyoctanoate,
and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal groups include epoxidized derivatives of polyethylenically unsaturated polcarboxylic acids, such as, for example, dimethyl 8,9,11,13-diepoxyeicosanedioate,
dibutyl 7,8,11,12-diepoxyoctadecanedioate,
dioctyl 10,11-diethyl-8,9,12,13-diepoxyeicosanedioate,
dicyclohexyl 3,4,5,6-diepoxycyclohexane-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,3-bis(cyclohexenyl)propane, 2,2-bis(cyclohexenyl)butane, 8,10-octadecadiene and the like.

The other component to be used in making the special adducts comprise an amine, and preferably an aromatic amine. These amines have at least two hydrogen attached to amino nitrogen and the amino nitrogen is or are preferably attached to an aromatic ring. Examples of the amines include among others, aniline, methylene dianiline, meta-phenylene diamine, meta-aminophenol, cyclohexylamine, hexamethylene diamine, toluidine, alphanaphthylamine, beta-naphthylamine, aminodiphenyl, piperazine, N,N'-dimethyl-m-phenylenediamine, 4,4' - diaminophenylsulfone, 4,4' - diaminophenylpropane, 4,4' - diaminodiphenylethane, and the like, and mixtures thereof. Particularly preferred amines to be used include the primary amines and preferably aromatic primary mono- and diamines possessing from 1 to 2 amino nitrogen attached to aromatic rings and containing from 6 to 24 carbon atoms.

The adducts are prepared by combining one or more of the above-described polyepoxides with one or more of the above-noted amines and heating the resulting mixture. In order to obtain the desired adducts instead of gelled resinous masses which are useless for the present purpose, it is necessary that an important detail be observed, namely, that a proper proportion of reactants be used. In order to obtain the desired products, one should employ a slight excess of the polyepoxide. The equivalent excess of the polyepoxide should vary from about 0.22 to 0.033 equivalent. By chemical equivalent amount as used herein is meant that amount needed to furnish one epoxide group for every amino hydrogen.

If one uses an amine which has a functionality greater than 2, the amount of polyepoxide and amine used should be such that the total overall average functionality of reactants should be between 2 and 2.5. This overall functionality can be determined by the following equation:

$$\frac{\frac{(X)(WX)}{(MX)} + \frac{Y(WY)}{(MY)} + \cdots\ ^1}{\text{Total number of moles per 100 grams of reactants}} = 2 \text{ to } 2.5$$

X=number of epoxy groups per mole of the polyepoxide.
MX=molecular weight of the polyepoxide.
WX=weight percent of total reactants of polyepoxide.
Y=number of amine hydrogen atoms on amine molecule.
MY=molecular weight of the polyepoxide.
WY=weight percent of total reactants of amine.

[1] (If more than one amine or polyepoxide is used, the equation should be continued with the same information about that reactant.)

The temperature employed in the formation of the adducts may vary from about 20° C. to 250° C. It is generally preferred to initiate the condensation at a low temperature, e.g., 50° C. to 110° C. and allow the reaction to exotherm to temperature of not more than 250° C. Cooling may be used as needed. The period at the higher temperatures should be short as possible, e.g. about 1 to 20 minutes, to avoid run away reactions. The reaction is preferably effected under atmospheric pressure although superatmospheric or subatmospheric pressures may be utilized as desired.

Solvents or diluents may be employed in the reaction if desired, but in most cases one or more of the reactants will be liquid and the mixing can be effected without the use of solvents. Suitable solvents if needed, include xylene, benzene, cyclohexane, dioxane, diethyl ether and the like.

The adducts may be recovered from the reaction mixture by any suitable means. If solvents or diluents are employed, they may be removed by evaporation, distillation, and the like. In the absence of such solvents or diluents, the adducts are generally recovered and used as the crude reaction product.

The adducts to be used in the process of the invention will be solid products having a softening point between 79° C. to 125° C., and more preferably 90° C. to 125° C. These softening points are determined by the Hercules method. The adducts will also have a WPE value of 400 to 932. WPE is weight in grams of the condensate needed to supply 1 epoxy group. It is determined by a silver nitrate-HCl method. According to this method, the condensate is added to a solution of HCl in tetrahydrofuran wherein the epoxy groups react with the HCl. The solution is then back titrated with silver nitrate to determine unreacted HCl. A sample without the condensate is also titrated with AgNO$_3$. The calculation is determined by the formula:

$$\frac{\left(\begin{array}{c}\text{milliliters of} \\ \text{AgNO}_3 \text{ for} \\ \text{reagent sample}\end{array} - \begin{array}{c}\text{milliliters of} \\ \text{AgNO}_3 \text{ used for single} \\ \text{sample containing condensate}\end{array}\right)\left(\begin{array}{c}\text{Normality} \\ \text{of AgNO}_3\end{array}\right)}{\text{Weight of Condensate Sample}}$$

$= X$ milliequivalents epoxy per gram sample $$\frac{1(100)}{\frac{(X)(100)}{(1000)}} = WPE$$

or $$\frac{1000}{(X)} = WPE$$

The lower the WPE the more reactive the adduct. Adducts having WPE over 625 are generally preferred when highly flexible products are desired.

The preparation of some of the adducts by the above method using aniline as the amine and polyether A of U.S. 2,633,458 as the polyepoxide is shown in the table in column 7.

These special adducts are then combined with the heterocyclic amines to form the new compositions of the invention. The heterocyclic amines to be used for this purpose include those heterocyclic compounds possessing in the ring a substituted imino group, i.e., a

group, and a secondary amino group, i.e., a =N=H group. Preferred examples of these compounds include, among others, the imidazoles, such as compounds of the formula

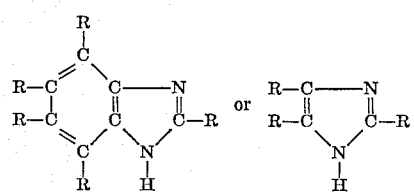

TABLE

| Adduct | Batch size, lb. | Composition, percent wt. | | | | | | | Reaction Conditions | | | | |
|---|---|---|---|---|---|---|---|---|---|---|---|---|---|
| | | Polyether A | Aniline | Salicylic acid | Methylene-dianiline | Meta-phenylene-diamine | m-Amino phenol | Cyclohexyl amine | Hexa-methylene-diamine | Initiation temp., °C. | Time to max temp., °C. | Max. temp., °C. | Time at max. temp., °C. | WPE | Melting Pt., °C. |
| A | 60.0 | 87.2 | 12.8 | | | | | | | 110 | 20 | 189 | 14 | 552 | 86 |
| B | 7.9 | 84.9 | 14.6 | 0.5 | | | | | | 49 | 30 | 192 | 11 | 821 | 101 |
| C | 7.0 | 84.3 | 15.2 | 0.5 | | | | | | 62 | 19 | 201 | 12 | 832 | 104 |
| D | 60.0 | 89.7 | 5.3 | | 5.0 | | | | | 120 | 16 | 185 | 20 | 417 | 83 |
| E | 7.9 | 86.2 | 9.8 | 0.5 | 3.5 | | | | | 52 | 27 | 184 | 3 | 640 | 100 |
| F | 7.0 | 91.8 | 5.4 | | | 2.8 | | | | 116 | 18 | 189 | 29 | 412 | 100 |
| G | 60.0 | 87.4 | 10.1 | | | 2.0 | | | | 50 | 28 | 188 | 3 | 632 | 79 |
| H | 7.9 | 88.7 | 5.2 | 0.5 | | | 6.1 | | | 57 | 40 | 158 | 1 | 450 | 85 |
| I | 60.0 | 84.3 | | | | | | 15.7 | | 39 | 39 | 176 | 19 | 781 | 98–106 |
| J | 1.3 | 85.8 | 13.5 | | | | | | 0.7 | 110 | 23 | 213 | 3 | 731 | 97 | wherein R is hydrogen, halogen or an organic radical, such as hydrocarbon radical or substituted hydrocarbon radical as the ester, ether, amide, imide, amino, halogen or mercapto substituted hydrocarbon radicals. Especially preferred are the imidazoles wherein R is hydrogen or a hydrocarbon radical, and preferably an alkyl, alkenyl, cycloalkyl, cycloalkenyl, aryl, alkaryl or arylalkyl radicals, and particularly those containing no more than 15 carbon atoms. Examples of such compounds include, among others, imidazole, 2-ethyl-4-methylimidazole, 2,4-dioctyl imidazole, 2-cyclohexyl-4-methyl imidazole, 2-butoxy-4-allyl imidazole, 2-carboethoxybutyl-4-methyl imidazole, 2,4-dichlorobutyl imidazole, 2-octyl-4-hexyl imidazole, and 2-ethyl-4-phenyl imidazole, and mixtures thereof. Other examples include the salts and other derivatives of the above-noted imidazole compounds as their organic and inorganic acid salts, such as for example, their lactate, benzoate, acetate salts, and the like.

The new heat curable powdered epoxy resin compositions of the present invention are obtained by effecting a special type of dry blending of the above-noted adduct with the heterocyclic amine. The blending is accomplished by utilizing the agglomeration principle as noted hereinafter. The proportion of the adduct and the heterocyclic amine used in making the composition may vary within certain limits. In general, it is preferred to utilize from .05 to 6 parts of the heterocyclic amine per 100 parts of the adduct. Preferred amounts varying from .1 part to 5 parts of the heterocyclic amine per 100 parts of the adduct.

When used in the dry blending process, it is preferred that the adduct be preground so that the particles have a size of less than 500 microns.

In this blending, the components are added, in any order, to the pebble mill which already contains the grinding media charge. After charging, the pebble mill is run for a sufficient time to assure proper particle agglomeration and film flow. The time period required for agglomeration is dependent on (1) the size of the pebble mill used, (2) the rotational speed of the mill and (3) the volume ratio of media to formulation components. The time period in the mill required for the proper film flow to be developed is very much dependent on the type of grinding media used (i.e., size, shape and media density). In general, the volume ratio of grinding media to total mill volume can be varied considerably depending upon the above-noted factors; however, such a ratio is usually between about 25% and 75% with about 50% being an especially good ratio. Upon termination of the grinding period, the powder is discharged and without further treatment is ready for use.

A feature of the above process is the utilization of high density grinding media. The high density grinding media may be spherical or cylindrical in shape with cylindrical media being preferred. The spherical media may range from about ¼ inch in diameter to 2 or more inches in diameter with a preferred diameter of from about ½ to 1½ inches in diameter. In general, the cylindrical media may range from about ½ inch in diameter to 2 or more inches in diameter with the preferred diameter being in the range of from ¾ inch to 1½ inches in diameter. The ratio of height to diameter of the cylinders may range from about 0.5:1 to about 3:1 with a 1:1 ratio being preferred. The term "high density" as used herein means a density which is at least 25% greater than porcelain and preferably at least 40% greater than porcelain. The density of the grinding media may be expressed in terms of specific gravity based on water as 1.0. Thus, the term "high density" as used herein means that the grinding media has a specific gravity of at least 2.75 and preferably greater than 3.5. The grinding media may be metallic, semi-metallic or non-metallic. In general, non-metallic media is preferred although grinding media such as steel, may be used in applications where metallic contamination is not a limiting consideration.

The volume ratio of media to formulation components may vary through a wide range with a ratio of from about 1:1 to about 5:1 being usually employed. Very good results are obtained when the weight ratio of media to components is from about 1:1 to about 10:1 with a ratio of about 5:1 to 10:1 being preferred.

As noted hereinbefore, the time required to assure proper agglomeration and film flow is dependent on many factors. Under the precise conditions the pulverized composition is ready for use after about 6 hours. It is generally preferred to screen the product to pass 100% through an 80 or 100 mesh screen.

While the adduct may be added to the pebble mill in flake or lump form, i.e., without pregrinding, it is generally preferred to pregrind the polyepoxide to approximately 20 mesh.

It will be appreciated that the present one-step process utilizing a pebble mill and high density media not only provides a simple process for pulverizing the ingredients into a fine powder but also forms an agglomerate of the particles of adduct and heterocyclic amine so that they do not separate on standing.

The new composition of the invention will appear as finely divided powder and have a particle size varying from less than 1 micron to about 175 microns. They can be connected to hard insoluble products by heating at 300° F.

The new heat curable epoxy resin compositions of the present invention may be utilized for a great many applications. They may be used, for example, as molding compositions and can be pressed, extruded or otherwise utilized in the formation of molded plastic articles. In these applications, curing temperatures ranging from about 250° F. to 350° F. are generally preferred. Pressures may vary from about 100 p.s.i. to 1000 p.s.i.

The new compositions may also be utilized as powdered adhesives or bonding agents to adhere various surfaces, such as metal, wood, ceramics, plaster, cement and the like together. In these applications the powdered composition is placed alone or in combination with liquid adhesive materials between the desired surfaces to be bonded and heat and pressure applied as noted above.

The new compositions are particularly suited for use in the formation of coatings as by spraying, dipping, etc. onto heated articles and then subjecting the coated product to post cure conditions. The compositions are particularly suited for use in fluidized bed systems for coatings. In this application, addition materials, such as fillers, thixotropic agents, pigments, accelerators, etc. are added to the composition and the resulting mixture utilized in the fluidized bed.

Suitable fillers which may be employed as desired includes, among others, aluminum powder, mica, bentonites, clays, synthetic resins and polymers, rubbers, ignited $Al_2O_3$, short-fiber asbestos, wood flour, carbon black, silica, zinc dust, talc and the like. A large number of fillers are available commercially in particle sizes from about 0.1 micron upward.

The quantity of fillers used is dependent upon many factors such as cost, particle size, particle shape, absorption characteristics and loading volume. The lightweight fillers such as asbestos and uncompressed mica are employed in ratios below 50 p.h.r. (parts per one hundred parts of polyepoxide) and generally below 35 p.h.r.; the medium weight fillers, such as talc and powdered aluminum, may be employed up to about 100 p.h.r.; and the heavier fillers may be employed up to about 150 p.h.r. In general, however, in order to optimize raw material costs without minimizing coating properties, the ratio of filler to polyepoxide ranges from about 10 to about 60 p.h.r.

It is generally desirable, although not necessary, to employ a thixotropic agent to prevent dripping or sagging at high film build. Any of the thixotropic agents normally used in the art are suitable for use in the present compositions, including silica aerogels, bentonite clays and their derivatives, castor oil derivatives and the like.

It is desirable in some cases to add flow control agents. Suitable agents include the polymers of long chain acrylates as poly(lauryl acrylate) and the like.

The proportions of the adducts, imidazole fillers, thixotropic agents, flow control agents and other additives will vary within wide ranges. However, rapid cure and excellent film flexibility is achieved when the final composition comprises from about 50 to 80 parts by weight of adduct and from about 1 to 20 parts by weight of imidazole and from about 5 to 50 parts by weight of the filler.

The fillers, pigments, etc. can be added during the dry blending of the adduct and imidazole or after that composition has been prepared. In the latter case, the fillers and pigments may be combined by grinding or otherwise mixing the powder together.

Any of the conventional fluidized bed coating techniques may be employed wherein the fluidized bed comprises the instant compositions maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C. before it is dipped into the fluidized bed. If an article is to be completely coated, it should, of course, be completely immersed in the fluidized bed. The article is preferably moved backwards and forwards in the bed, over a period of time determined by the desired thickness of coating. For the production of thin coating, i.e., less than 0.015 inch thick, the period during which an article is dipped or immersed into the bed is usually less than three seconds.

After the article has been in contact with the fluidized bed for the desired time, it is removed, excess powder adhering to the article is preferably removed, and the coating cured by heating to at least 125° C., and preferably between 150 and 250° C.

The compositions of the instant invention may also be sprayed as by a compressed air spray gun or electrostatically, i.e., by maintaining a difference in electrostatic charge between the particles and the article to be coated.

To illustrate the manner in which the present invention may be carried out, the following examples are given. The examples are given only to illustrate the invention and are not to be regarded as limiting the scope of the invention in any way. Unless otherwise indicated, parts and percentages disclosed in the examples are by weight. The polyethers referred to as letter, such as polyether A, are those disclosed in U.S. 2,633,458.

EXAMPLE I

This example illustrates the preparation of a heat-curable powdered epoxy resin composition from (1) an adduct of polyether A as disclosed in U.S. 2,633,458 and methylene dianiline, and (2) imidazole.

An adduct was prepared from polyether A, aniline and methylene dianiline having a WPE of 640 and softening point of 100° C. (adduct E in table). This adduct was combined with imidazole, pigment and filler according to the following recipe:

| | Parts |
|---|---|
| Adduct | 621 |
| Imidazole | 18.6 |
| Titanium dioxide | 24.0 |
| Silica filler | 136 |
| Poly(lauryl acrylate) flow control agent | .4 |
| | 800.0 |

The adduct was first preground to approximately 20 mesh. All of the components were then placed in a 1½ gallon pebble mill containing 5,500 grams of grinding media. After charging, the mill was run at a peripheral speed of 230 ft./minute for 15 hours. On completion of grinding, the powder was discharged from the mill. The sieve analysis of the resulting product is as follows:

| Sieve size No: | Percent retained |
|---|---|
| 50 | 3.6 |
| 80 | 12.4 |
| 100 | 12.8 |
| 200 | 63.2 |
| 325 | 4.8 |
| Pan | |

The above-noted powder was then heated at 320° F. to determine the gel time. The results are shown below according to the sieve size.

| No.: | Seconds |
|---|---|
| 50 | 8.2 |
| 8.8 | 8.8 |
| 100 | 8.3 |
| 200 | 8.6 |
| 325 | 8.5 |
| Pan | |

The particles were stable on storage at room temperature for 60 days. The combined powder had a gel time of only 3 seconds at 320° C.

The above-noted powder was used to coat a steel panel in the following manner. A solvent-cleaned 1½ inches by 6 inches guage, cold rolled steel panel was heated on a carefully controlled hot plate to a temperature of 325° F. A stream of powder was directed at the panel with a Binks Model 171 Flocking Gun (OB–11 nozzle). The panel was allowed to remain on the hot plate for a 30 second cure cycle. The film was 7–10 mils thick. The coating was hard but flexible and had excellent resistance to solvents.

Similar coatings were prepared and tested for solvent resistnace and flexibility. The properties are shown below:

Methyl ethyl ketone resistance (minutes)—15
Methyl isobutyl ketone ressitance (minutes)—>60
Flexibility (1 inch mandrel)—
  Degrees:
    Cure 30 sec. at 300° F.—10
    Cure 30 sec. at 325° F.—20
    Cure 30 sec. at 350° F.—>180

EXAMPLE II

Example I was repeated with the exception that the adduct employed was an adduct of polyether A, aniline and methylene dianiline having a WPE of 600 and a softening point of 95° C.

The gel times in seconds of the particles according to sieve size are as follows:

| No.: | Seconds |
|---|---|
| 50 | 6.5 |
| 80 | 6.4 |
| 100 | 6.6 |
| 200 | 6.5 |
| 325 | 6.5 |

The properties of panels coated with the powder by the process of Example I are as follows:

| | Minutes |
|---|---|
| Methyl ethyl ketone resistance | 20 |
| Ketone resistance | >60 |

EXAMPLE III

Example I was repeated with the exception that the adduct employed was an adduct of polyether A and methylene dianiline having a WPE of 550 and a softening point of 90° C.

The gel times in seconds of the particles according to sieve size are as follows:

| No.: | Seconds |
|---|---|
| 50 | 5.2 |
| 80 | 5.1 |
| 100 | 5.2 |
| 200 | 5.2 |
| 325 | 5.0 |

The properties of panels coated with the powder by the process of Example I are as follows:

| | Minutes |
|---|---|
| Ketone resistance | 30 |
| Methyl isobutyl ketone resistance | >60 |

EXAMPLE IV

Example I was repeated with the exceptlion that the adduct employed was an adduct of polyether A and methylene dianiline having a WPE of 417 and softening point of 83° C. The amount of imidazole curing agent was 0.75 part per 100 parts of adduct.

The resulting composition had a gel time at 320° F. of 6.0 seconds. The panels were hard and flexible and had good appearance and solvent resistance. Properties of panels coated with the powder by the process of Example I are as follows:

| Methyl ethyl ketone resistance: | Minutes |
|---|---|
| Cure ½ minute 300° F. | >60 |
| Cure 1 minute 300° F. | >60 |

EXAMPLE V

Other compositions prepared from aniline based adducts and imidazole were prepared as shown in the following table. The gel times at 320° F. and the properties of the resulting panels are also shown in the table.

EXAMPLE VI

Example I was repeated with the exception that the imidazale was replaced by benzimidazole. Related results are obtained.

EXAMPLE VII

Example I was repeated with the exception that the adduct employed was an adduct of the diglycidyl ether of resorcinol and m-phenylene diamine. Related results are obtained.

EXAMPLE VIII

Example I was repeated with the exception that the curing agent employed was 2-ethyl-4-methyl imidazole lactate. Related results are obtained.

EXAMPLE IX

Example I was repeated with the exception that the curing agent was imidazole lactate.

EXAMPLE X

Example I was repeated with the exception that the curing agent was imidazole benzoate. Related results are obtained.

EXAMPLE XI

An adduct was prepared from polyether A and methylene dianiline having a WPE of 640 and a softening point of 100° C. (adduct E in table). The adduct was combined with imidazole lactate, pigment and filler according to the following recipe:

| | Parts by weight |
|---|---|
| Adduct | 699 |
| Imidazole lactate | 21 |
| TiO₂ | 56 |
| Lead chromate | 24 |

The adduct was preground to approximately 20 mesh. All of the components were placed in a 1½ gallon pebble mill containing 5,500 grams of grinding media. After charging, the mill was run at a peripheral speed of 230 ft./minute for 15 hours. On completion of the grinding, the powder was discharged from the mill. The sieve analysis of the resulting product is as follows:

No.:
30 ------------------------------------ 1.2
50 ------------------------------------ 2.8
80 ------------------------------------ 5.6
100 ----------------------------------- 8.0
200 ----------------------------------- 52.4
325 ----------------------------------- 27.6

Gel time at 320° F. was as follows:

No.:                                             Seconds
30
50 ------------------------------------ 37.1
80 ------------------------------------ 31.2
100 ----------------------------------- 36.4
200 ----------------------------------- 39.0
325 ----------------------------------- 39.6

The combination had a gel time of 38.2 seconds. After six months storage at room temperature, the product still had a gel time of 38.2 seconds.

The above-noted powder was used to coat steel panels as in Example I. The coating had a flexibility after 4 minutes at 325° F. greater than 180° F. The methyl ethyl ketone solvent resistance was as follows:

Minutes
1 minute, 300° F. ------------------------- 0–1
3 minutes, 300° F. ------------------------ 10–15
4 minutes at 300° F. ---------------------- 15–20

TABLE

| Polyether A precondensate resins, amine modifier | Resin characteristics | | Catalyst | Catalyst level, phr. | Gel time at 320° F., seconds | Cure [3] (min./° F.) | | Flexibility [4] 1″ mandrel, degrees |
|---|---|---|---|---|---|---|---|---|
| | WPE [1] | Softening Pt., ° C. [2] | | | | MIBK res., >60 mins. | MEK Res., >60 mins. | |
| Adduct A | 552 | 86 | Imidazole | 3 | 9.6 | ½/300 | 1/300 | |
| Adduct B | 821 | 101 | do | 3 | 15.5 | 1/300 | 3/300 | >180 |
| Adduct C | 932 | 104 | do | 5 | 17.0 | 1/300 | 5/300 | >180 |
| Adduct D | 417 | 83 | do | 1.5 | 6.6 | ½/300 | 1/300 | |
| Do | 417 | 83 | do | 3 | 6.0 | ½/300 | ½/300 | |
| Adduct F | 412 | 79 | do | 0.75 | 6.5 | 1/300 | 2/300 | |
| Do | 412 | 79 | do | 1.5 | 3.4 | ¾/300 | 1/300 | |
| Do | 412 | 79 | do | 3 | 1.5 | ½/300 | ½/300 | |
| Adduct G | 632 | 98–106 | do | 3 | 4.0 | ½/300 | ¾/300 | >180 |
| Adduct H | 450 | 85 | do | 3 | 6.0 | ½/300 | ¾/300 | |
| Adduct I | 781 | 97 | do | 3 | 16.5 | 1/300 | 1½/300 | >180 |
| Adduct G | 731 | 97 | do | 3 | 15.3 | ½/300 | 1/300 | >180 |

[1] Determined by AgNO₃/HCl method.
[2] Determined by Hercules drop method.
[3] Cure measured by methyl isobutyl and methyl ethyl ketone resistance. Cure time and temperature necessary to obtain 60 minutes MIBK resistance and 60 minutes MEK resistance (cure time in minutes).
[4] Flexibility run on sprayed 1½″ x 6″ steel panels containing 7–10 mils film thickness over the 1″ mandrel.

We claim as our invention:
1. A powdered heat-curable epoxy resin composition comprising a dry homogeneous blend of (1) an adduct of a polyepoxide having more than one vic-epoxy group and an aromatic amine possessing at least two active hydrogen atoms attached to amino nitrogen, which adduct is soluble in acetone, has a softening point of between about 79° C. and 125° C., and a WPE of 400 to 932 wherein WPE is the weight in grams needed to supply one epoxy group, and (2) an imidazole compound of the formula

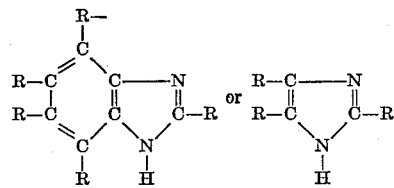

acid salts of said imidazole compound or mixtures thereof wherein R is a member selected from the group consisting of hydrogen, halogen, hydrocarbon radicals, halogen-substituted hydrocarbon radicals and ether-substituted hydrocarbon radicals.

2. A powdered heat-curable epoxy resin composition capable of curing in less than about 1 minute at 300° F. comprising a dry homogeneous blend of (1) finely divided particles of an adduct of a liquid polyglycidyl ether of 2,2-bis(4-hydroxyphenyl)propane and an aromatic amine possessing at least two active hydrogen atoms attached to amino nitrogen, which adduct is soluble in acetone, has a softening point of between about 90° C. and 125° C., and a WPE of 400 to 932 wherein WPE is the weight in grams needed to supply one epoxy group, and (2) finely divided particles of an imidazole compound of the formula

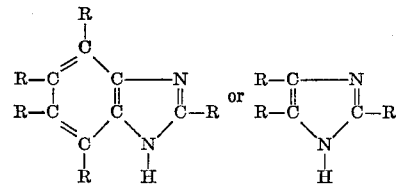

acid salts of said imidazole compound or mixtures thereof wherein R is a member selected from the group consisting of hydrogen, halogen, hydrocarbon radicals, halogen-substituted hydrocarbon radicals and ether-substituted hydrocarbon radicals, said imidazole compound making up to 0.05 to 6 parts per 100 parts of the adduct.

3. A powdered composition as in claim 2 wherein the amine is methylenedianiline.
4. A powdered composition as in claim 2 wherein the amine is aniline.
5. A powdered composition as in claim 2 wherein the amine is meta-aminophenol.
6. A powdered composition as in claim 2 wherein the particles have a size of less than 500 microns.
7. A powdered composition as in claim 2 wherein the composition also contains a silica filler and pigment.
8. A powdered composition as in claim 2 wherein the imidazole compound is imidazole.
9. A powdered composition as in claim 2 wherein the imidazole compound is benzimidazole.
10. A powdered composition as in claim 2 wherein the imidazole compound is a lactate salt of 2-methyl-4-ethyl imidazole.
11. A powdered composition as in claim 2 wherein the curing agent is imidazole lactate.
12. A powdered composition as in claim 2 wherein the curing agent is imidazole benzoate.
13. A process for converting the powdered composition of claim 1 to hard insoluble infusible product which comprises heating the composition to a temperature above 250° F. for a short period.

14. A composition as in claim 2 wherein the imidazole is a compound of the formula

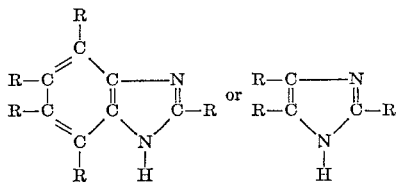

acid salts of said imidazole compound or mixtures thereof wherein R is hydrogen or a hydrocarbon radical selected from the group consisting of alkyl, alkenyl, cycloalkyl, cycloalkenyl, aryl, alkaryl and arylalkyl radicals containing no more than 15 carbon atoms.

15. A composition as in claim 2 wherein the imidazole compound is a monocarboxylic acid salt of an imidazole.

16. A composition as in claim 2 wherein the imidazole is a salt of an imidazole and an acid of the group consisting of acetic, formic, lactic, phosphoric, and benzoic acids.

References Cited

UNITED STATES PATENTS 3,362,922   1/1968   Manasia et al.

WILLIAM H. SHORT, Primary Examiner

T. PERTILLA, Assistant Examiner

U.S. Cl. X.R.

117—123, 127, 148, 161; 260—2, 18, 47, 88.3